April 16, 1968  F. J. PAPA, JR  3,378,123
CLUTCH FOR A TIMER DEVICE
Filed July 1, 1966  3 Sheets-Sheet 1

INVENTOR
FRANK J. PAPA
BY Norman A. Witt
ATTORNEYS

April 16, 1968   F. J. PAPA, JR   3,378,123
CLUTCH FOR A TIMER DEVICE
Filed July 1, 1966   3 Sheets-Sheet 2
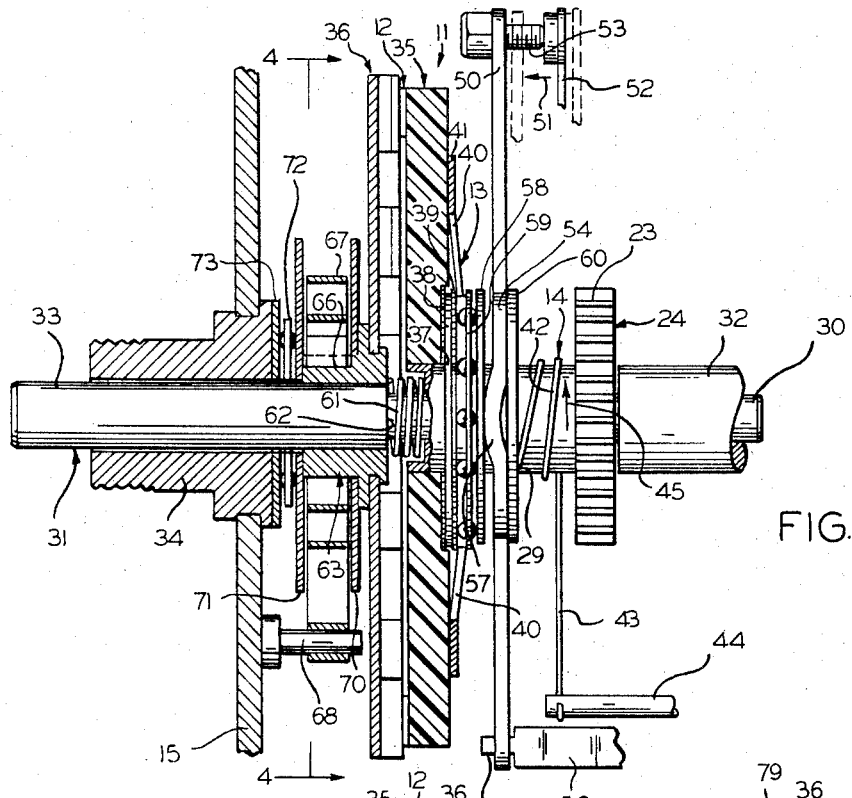
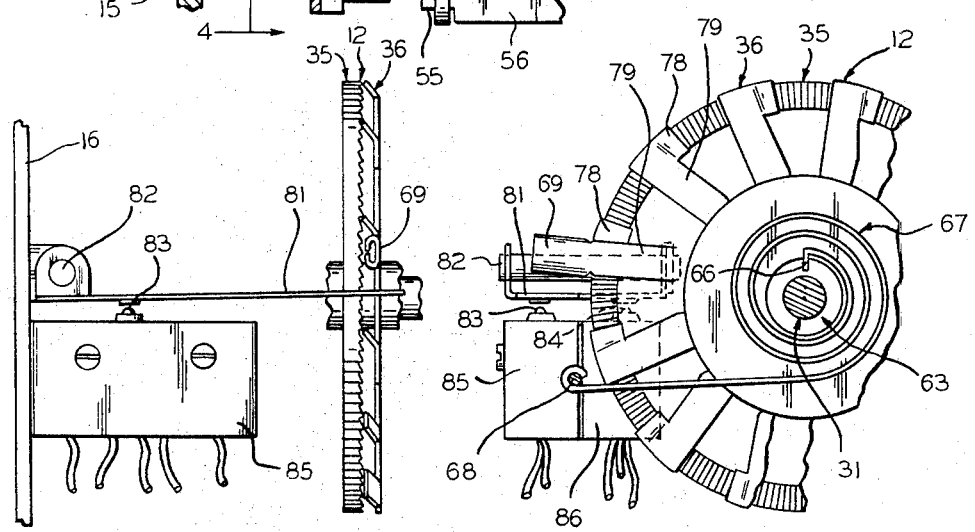
FIG.3
FIG.5   FIG.4
INVENTOR
FRANK J. PAPA
BY *Norman A. Witt*
ATTORNEYS April 16, 1968     F. J. PAPA, JR     3,378,123
CLUTCH FOR A TIMER DEVICE
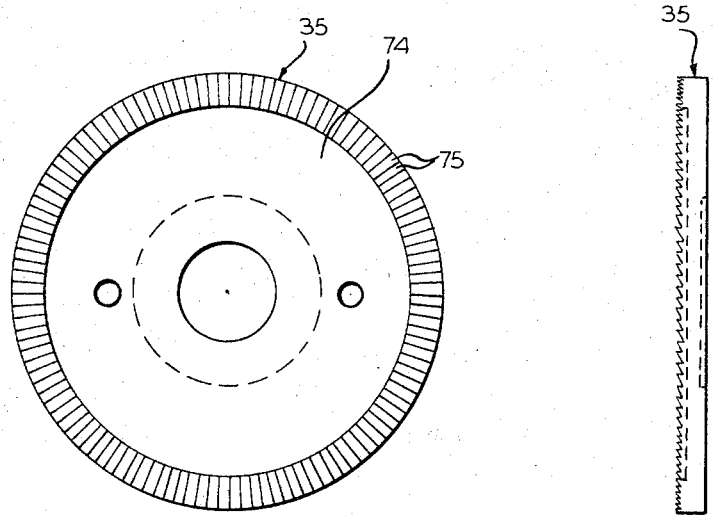
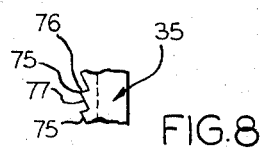
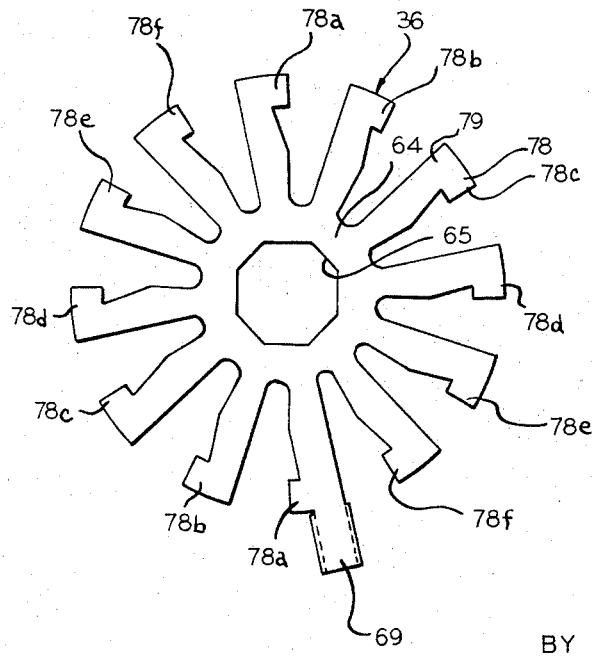
INVENTOR
FRANK J. PAPA
BY *Norman A. Witt*
ATTORNEYS

United States Patent Office 3,378,123
Patented Apr. 16, 1968

3,378,123
CLUTCH FOR A TIMER DEVICE
Frank J. Papa, Jr., Montville, N.J., assignor to Industrial Timer Corporation, Parsippany, N.J., a corporation of New Jersey
Filed July 1, 1966, Ser. No. 562,305
14 Claims. (Cl. 192—67)

ABSTRACT OF THE DISCLOSURE

Clutch for a timer device including a driven element and a driving element, wherein one of the elements includes a disc member having a plurality of circumferentially arranged and equally spaced teeth for engagement with a plurality of circumferentially arranged pawls on the other element, and the relationship between the number of pawls and the teeth spacing together with the pawl spacing is such that only one or a pair of diametrically opposed pawls engage the teeth at any one time.

---

This invention relates in general to a timer device, and more particularly to a clutch arrangement for a timer device, and still more particularly to a clutch for a timer device that provides accuracy with positive engagement, although other uses and purposes may be apparent to one skilled in the art.

The clutching arrangement of the present invention is provided especially for timing devices where it is desired to generate precise periods of time for actuation of mechanisms, and particularly where operation of electrical circuitry in accordance with timed intervals is desired. For example, such a timer device might be employed to open and close one or more electrical circuits at precise timed intervals. The clutching arrangement may include two different clutches and a one-way brake on one shaft such as a one-way spring brake, a friction clutch, and a driving clutch that is actuatable between driving and nondriving positions. The driving clutch is especially useful for defining timed intervals of an exact nature for actuation of mechanisms in that it is self-engaging, operable for only one direction of rotation, and provides a high degree of accuracy with positive engagement. This clutch includes a driving element and a driven element, wherein one of the elements is provided with an equal number of circumferentially arranged and equally spaced teeth for engagement with a plurality of circumferentially arranged pawls on the other element. The pawls number at least twice the number of degrees spacing between each of the teeth and are spaced from each other and offset that part of a degree equal to the number of degrees between each of the teeth divided by the number of pawls so that only one pawl fully engages a tooth at any time that the clutch elements are in engagement with each other. Preferably, the pawls are provided in pairs, wherein the pawls of each pair are diametrically opposed, and in such an arrangement the pairs of pawls are spaced from each other starting with the first pair to the last pair in equal degree distances plus that part of a degree equal to the number of degrees between each of the teeth divided by the number of pawls, wherein only one pair of pawls fully engage a pair of diametrically opposed teeth whenever the clutch elements are in engagement. The driving clutch element is further connected to a driving member through a friction clutch, and a one-way spring brake coacts with the driving member to permit rotation in the driving direction and inhibit rotation in the opposite direction. Suitable means is provided for causing clutching and declutching the clutch elements in response to rotation of the driven clutch element. Such means preferably includes switches actuatable by the clutch driven element to control the power being delivered to the clutch driving element and the means for causing engagement of the clutch elements.

It is therefore an object of the present invention to provide a clutching arrangement for a timer device that includes drive and friction clutches and a one-way brake arranged on one shaft.

Another object of this invention is in the provision of a clutching arrangement for a timer device that includes a drive clutch that is self-engaging, operable in only one direction of rotation, capable of accurate and positive engagement, and is simple and of low cost to manufacture.

Still another object of this invention resides in the provision of a drive clutch for a timer device including a driving element and a driven element wherein one of the elements is provided with an equal number of circumferentially and equally spaced teeth and the other element is provided with a plurality of pawls adapted to engage the teeth of a number equal to at least twice the number of degrees spacing between each of the teeth and being spaced from each other and offset that part of a degree equal to the number of degrees between each of the teeth divided by the number of pawls so that only one pawl fully engages a tooth at any time the clutch elements are in engagement.

Other objects, features and advantages of the invention will be apparent from the following detailed disclosure, taken in conjunction with the accompanying sheets of drawings, wherein like reference numerals refer to like parts, in which:

FIG. 3 is an enlarged sectional view taken through the clutching arrangement of the present invention, and illustrating some parts broken away and other parts in full for purposes of clarity;

FIG. 4 is a fragmentary detailed view, taken substantially along line 4—4 of FIG. 3 but on a reduced scale, and illustrating the driving and driven element of the drive clutch according to the present invention;

FIG. 5 is a side elevational view taken substantially along line 5—5 of FIG. 1, with many parts omitted, to illustrate the coaction between the drive clutch and operating switches;

FIG. 6 is a front elevational view of one of the driving elements in the drive clutch according to the present invention;

FIG. 7 is a side elevational view of the driving element of FIG. 6 and with some parts in dotted lines for purposes of clarity;

FIG. 8 is a greatly enlarged fragmentary view of a portion of the drive element of FIGS. 6 and 7 to illustrate the teeth thereon; and FIG. 9 is a plan view of the clutching element that coacts with the clutch element of FIGS. 6 and 7 according to the present invention.

Figures 1, 2:
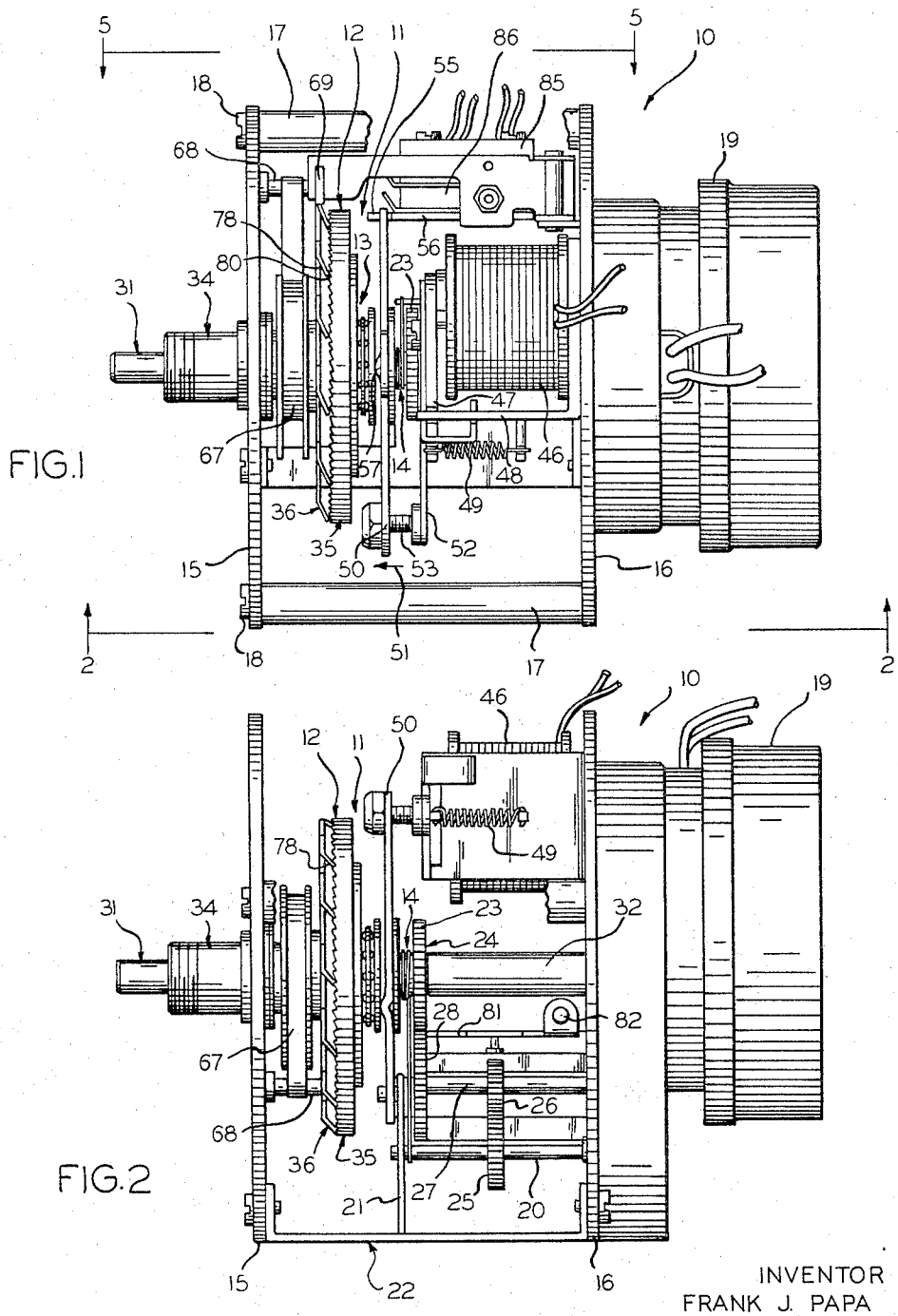
FIG. 1 is a top plan view of a timer device embodying the clutch arrangement of the present invention.
FIG. 2 is a side elevational view of the timer device of FIG. 1, and taken substantially along line 2—2 thereof.

Referring now to the drawings, and particularly to FIGS. 1 and 2, a timer device, generally designated by the numeral 10 embodying the clutching arrangement of the present invention is illustrated. The clutching arrangement, which may be generally designated by the numeral 11, includes a drive clutch 12, a friction clutch 13 and a one-way spring brake 14, and it should be appreciated that the clutching arrangement 11 may be employed on any type of timer device, but is illustrated herein in use on a timer device capable of defining precise time intervals for operation of any suitable mechanisms.

The clutching arrangement 11 is mounted between front and back mounting plates 15 and 16 held in spaced apart, parallel relationship by spacers 17 and fasteners 18, FIG. 1, all of which essentially define a frame for the timer device. Suitably secured to the rear mounting plate 16 is a synchronous motor and reduction gear assembly 19 having an output shaft 20, FIG. 2, driven at a timed rate such as one revolution per minute. The outer free end of the shaft 20 is rotatably supported by an upstanding arm 21 of a gearing support bracket 22 that extends between the front and rear mounting plates 15 and 16 and is secured thereto by suitable fasteners. The output shaft 20 is suitably drivingly connected to a pinion gear 23 or a driving member 24 of the clutching arrangement 11. While any suitable type of gearing may be provided between the output shaft 20 and the driving memebr 24, a simple gearing arrangement is illustrated herein for purposes of clarity and which includes a pinion gear 25 secured to the output shaft 20 in engagement with a pinion gear 26 that is secured to an idler shaft 27. One end of the idler shaft 27 is rotatably carried by the rear mounting plate 16, while the other end is rotatably carried by the arm 21 of the gear supporting bracket 22. The idler shaft transmits power from the output shaft 20 to the driving member 24 through a pinion gear 28 that is in meshing engagement with the pinion gear 23 of the driving member 24.

The drive member 24 includes a sleeve portion 29, FIG. 3, having the pinion gear 23 secured to one end thereof and being freely rotatably supported on a diametrically reduced portion 30 of a timing shaft 31. The shaft 31 is bearingly supported at the end having the diametrically reduced portion 30 by a sleeve bearing 32 that extends from and is fixed to the rear mounting plate 16. The other end of the shaft 31, having an enlarged diametrical portion 33 is bearingly supported by a bushing 34 suitably secured to the front mounting plate 15.

The drive clutch 12 includes a driving clutch element 35 and a driven clutch element 36, these elements being relatively movable toward and away from each other for selective clutching and declutching action. The driving element 35 is carried on the sleeve 29 and rotatable with the driving member 24 through friction clutch 13, while the driven element 36 is carried on and rotatable with the shaft 31, wherein engagement of the driving elements causes a transmission of power from the driving member 24 to the shaft 31. While either of the clutch elements may be mounted for movement toward and away from the other clutch element, the driving element 35 is mounted for axial sliding movement on the reduced diametrical portion 30 of the shaft 31 toward and away from the driven element 36 by any suitable means and by a means that will be hereinafter more clearly set forth.

The friction clutch 13 couples the driving member 24 to the driving element 35 of the drive clutch 12, and includes a radial flange 37 on the sleeve portion 29 sandwiched between inner and outer washers 38 and 39, respectively. The outer washer 39 is biased into engagement with the radial flange 37, the latter of which is in turn biased against the inner washer 38 that is seated in a recess formed in the driving element 35 by a plurality of spring fingers 40 that are supported by a retaining ring 41 which is suitably secured to the driving element 35. Thus, the driving member 24 and the driving element 35 will always rotate together unless there is a reverse force placed on one or the other, and this friction clutch especially protects against damage of the drive clutch 12 should something prevent rotation of the driving element 35 while power is continually being applied to the driving member 24.

In order to inhibit reverse rotation of the driving member 24 when power is not being applied thereto by the motor 19, and which reverse rotation would distort the timing cycle or interval, the one-way spring brake 14 is provided which merely includes a plurality of loops 42 extending around the sleeve portion 29 and an anchoring end 43 that is suitably fixed to a stationary pin 44 on the frame. This brake allows free rotation of the driving member 24 in the direction of the arrow 45, FIG. 3, but inhibits rotation thereof in the opposite direction.

Movement of the clutch driving element 35 and driving member 24 toward and away from the clutch driven element 36 is accomplished by means of a magnet coil 46 that is mounted on the rear mounting plate 16, which includes a pivotally mounted armature 47, shown in energized position in FIGS. 1 and 2. The armature 47 is pivotally supported on a bracket 48, and biased to de-energized position by a spring 49. Energizing of the magnet coil 46 applies a force on a clutch arm 50 in the direction of an arrow 51, FIGS. 1 and 3, through an extension 52 of the armature 47 and a threaded stud 53 carried by the arm 50. The amount of movement effected of the clutch arm 50 may be adjusted by threadedly adjusting the stud 53 relative to the arm.

The clutch arm 50 includes a central enlarged portion 54 having an opening therethrough so as to be freely and guidably received on the sleeve portion 29 of the driving member 24, and is pivotally mounted at the end opposite the force applying end on a pivot pin 55 that is suitably carried by a bar 56 extending from the rear mounting plate 16. Suitable raised portions or projections 57 extend from the enlarged portion 54 in the direction of the drive clutch 12, and bear against a washer 58, that in turn bears against a ball bearing race 59. The ball bearing 59 engages against the outer washer 39 of the friction clutch 13. A washer 60 is carried on the sleeve portion 29 of the drive member 24 and bears against the other side of the clutch arm 50, and is maintained in substantial engagement therewith by the spring brake 14. Thus, actuation or energization of the magnet coil 46 causes the operation of the clutch arm 50 and movement of the driving element 35 of the drive clutch 12 into engagement with the driven element 36. The de-energization of the magnet coil 46 allows movement of the driving element 35 away from the driven element 36 by action of a coil spring 61, FIG. 3, received on the diametrically reduced portion 30 of the shaft 31, and bottomed at one end in a recess formed in the end of the driving member sleeve portion 29 adjacent the driven element 36, and at the other end against a shoulder 62 formed between the large and small diametrical sections of the shaft 31, and a bushing 63 carried on the enlarged portion 33 of the shaft.

The driven element 36 of the drive clutch 12 includes a body 64 having an opening 65 therethrough to be received and staked on to the bushing 63, which is in turn suitably secured to the larger portion 33 of the shaft 31. The bushing 63 is provided with an axially extending slot 66 for receiving one end of a coiled leaf spring 67, FIGS. 3 and 4, the other end of which is secured to a pin 68 extending from the front mounting plate 15. Looking at FIG. 4, the driving clutch element 35 drives the driven element 36 in a counterclockwise direction, while the spring 67 drives the driven element 36 in a clockwise direction upon being released from the driving element 35 until an extension 69 of one of the radial arms of the driven element 36 homes against the pin 68. Guiding washers 70 and 71 are carried on the shaft 31 and on opposite sides of the leaf spring 67 to maintain the spring in alignment. A ball bearing race 72 is carried on the shaft 31 between the washer 71 and a washer 73 that is arranged against the bushing 34 carried on the mounting plate 15.

The drive clutch 12 is self-engaging when the driving element 35 engages the driven element 36, and is defined by a disc-shaped driving element 35 that may be of any suitable material but is illustrated herein as being of plastic, such as Delrin, while the driven element 36 is in the form of a spider member. A radial face 74 is provided on the side of the driving element 35 facing the driven element 36, and a plurality of circumferentially arranged and equally spaced teeth 75 are formed on the face 74. In accordance with the invention, the teeth must be of an equal number, and as seen in FIG. 8, each tooth is defined by a sloping short side 76 and a sloping long side 77. The teeth 75 coact with pawls 78 formed on the outer ends of radial arms 79 that are circumferentially arranged in extending relation from the body 64 of the driven element 36. Each pawl 78 includes a nose or engaging portion 80 that is adapted to engage against the short sloping side 76 of a tooth 75. The pawls 78 are provided in pairs, and in the embodiment illustrated in FIG. 9 include pairs 78a, 78b, 78c, 78d, 78e and 78f, and are spaced from each other so that only one of the pairs engages a diametrically opposed pair of teeth of the driving element 35 at any one time that the driving and driven elements are in engagement with each other. In the embodiment illustrated, the driving element 35 is provided with one hundred twenty teeth equally spaced apart, and therefore spaced apart a radial distance of 3°. Six pairs of pawls, or twice the number of degrees spacing between each of the teeth, are provided on the driven element 36, which pairs of pawls are spaced apart starting with the first pair of pawls 78a and subsequently through the last pair of pawls 78f a degrees distance of 30½° or 30° and 30 minutes. Thus, each succeeding pair of pawls is spaced a given degree distance plus one-half a degree from the preceding set of pawls starting from the first set of pawls whereby the numerical relationship between the pawls and spacing of the teeth is such that the engagement accuracy of the drive clutch is within one-half of a degree. It should be appreciated that any number of pairs of pawls which is a multiple of the number of degrees spacing between adjacent teeth on the driving member may be provided and then offset between adjacent pairs of pawls a degree distance that would be equal to the number of degrees spacing divided by the number of pairs of pawls employed. For example, if the 3° circular measure spacing were provided with twelve pairs of pawls, the pairs of pawls would be offset one-fourth of a degree. Further, while the driven element 36 is shown with pairs of pawls, it should be appreciated that single pawls may be employed so long as the pawls are offset from each other a degree distance equal to the degree spacing between teeth divided by a number of pawls. The pawls of each pair in the embodiment of FIG. 9 are diametrically opposed, and therefore spaced apart 180°. While the teeth 75 are shown formed on a radial face of the driving element 35, it should be appreciated that they could be formed on a conical or cylindrical face with compensating modification of the pawls on the driven element 36.

The extension 69, FIGS. 1, 4 and 5, also functions in the timing cycle or interval established by the timer device in that it serves to engage switch arm 81 arranged laterally of the periphery of the drive clutch 12 and pivotally carried on a pin 82 supported on the rear mounting plate 16. Downward movement of the switch arm 81 causes engagement and actuation of plungers 83 and 84 of switch 85 and 86, respectively. As seen in FIG. 1, the switches 85 and 86 are mounted on the bar 56. The switch 85 is a normally closed switch and interconnected with the motor 19 so that upon actuation of the plunger 83, the circuit to the motor 19 is opened causing discontinuance of the transmission of power to the driving element 35 of the drive clutch 12. The switch 86 is interconnected into the circuitry of the magnet coil 46 with normally closed contacts which are opened upon actuation of the plunger 84 causing de-energization of the magnet coil 46 and declutching of the drive clutch 12. Declutching of the drive clutch 12 allows the return spring 67 to rotate the driven element 36 in the opposite direction thereby removing the extension 69 from the switch arm 81 and allowing the normally closed contacts in the switches 85 and 86 to again close and again energize the circuits of the motor 19 and the magnet coil 46. This will again drive the extension 69 towards the switch arm 81 for a repeated time cycle of operation of the switches 85 and 86. Other circuitry may be connected to the normally closed contacts of the switch 86, and this switch may also be provided with normally open contacts for still further circuitry, all of which will respond to the timing cycle or interval established by the timer device. The device as shown in the drawings would of course be arranged within a housing, and if desired, the outer end of the shaft 31 may be provided with an indicating needle for coaction with a dial to indicate the timed cycle or interval. Because of the positive locking engagement of the drive clutch and the accuracy of engagement due to the spacing of the pawls relative to the teeth, a very precise time cycle or interval can be defined.

It will be understood that modifications and variations may be effected without departing from the scope of the novel concepts of the present invention, but it is understood that this application is to be limited only by the scope of the appended claims.

The invention is hereby claimed as follows:

1. In a timer device having a clutch for selectively coupling a driving member to a driven member, said clutch comprising a driving element connected to said driving member and a driven element connected to said driven member, one of said elements including a body having an equal number of teeth arranged circumferentially thereon and equally spaced from each other, the other of said elements including a body having a plurality of circumferentially arranged pawls thereon adapted to engage the teeth of the one said element, the number of pawls being equal to at least twice the number of degrees spacing between immediately adjacent teeth and said immediately adjacent pawls from the first to the last being spaced from each other a given degree distance plus that part of a degree equal to the number of degrees between immediately adjacent teeth divided by the number of said pawls, and means for selectively moving said elements into and out of engagement with each other to selectively couple and uncouple said members.

2. In a timer device having a clutch as defined in claim 1, wherein said one element includes a disc having a radial face with the teeth thereon.

3. In a timer device having a clutch as defined in claim 2, wherein said other of said elements includes radial arms with a pawl on each of said arms.

4. In a timer device having a clutch as defined in claim 1, wherein spring means is provided between said elements to normally urge them out of engagement and said moving means operates positively to cause engagement and passively to permit disengagement by said spring means.

5. In a timer device having a clutch for selectively coupling a driving member to a driven member, said clutch comprising a driving element connected to said driving member and a driven element connected to said driven member, one of said elements including a body having an equal number of teeth arranged circumferentially thereon and equally spaced from each other, the other of said elements including a body having a plurality of pairs of circumferentially arranged pawls thereon adapted to engage the teeth of the one said element, the pawls of each pair being diametrically opposed, the number of pairs of pawls being equal to at least twice the number of degrees spacing between immediately adjacent teeth and said immediately adjacent pairs of pawls being spaced from each other starting with the first pair of pawls to the last pair of pawls an equal degree distance plus that part of a degree equal to the number of degrees between immediately adjacent teeth divided by the number of pairs of said pawls so that only one pair of pawls fully engage a pair of diametrically opposed teeth at any time the clutch elements are in engagement, and means for selectively moving said elements into and out of engagement with each other to selectively couple and uncouple said members.

6. In a timer device having a clutch as defined in claim 5, wherein said one element is the driving element and the other of said elements is the driven element.

7. In a timer device having a clutch as defined in claim 5, wherein 120 teeth are provided on the body of said one element, six pairs of pawls are provided on the body of said other element, and said spacing between the pawls is 30½ degrees.

8. In a timer device having a clutch as defined in claim 5, wherein spring means is provided between said elements to normally urge them out of engagement and said moving means operates positively to cause engagement and passively to permit disengagement by said spring means.

9. In a timer device having a clutch as defined in claim 5, and means to move said one element to a home position when it is disengaged from said other of said elements.

10. In a timer device having a clutch as defined in claim 9, and switch means operated by said one element for releasingly actuating said element moving means.

11. In a timer device including a rotatably mounted shaft, first and second clutches and a spring brake associated with said shaft, said first clutch including a sleeve portion rotatably and slidably mounted on said shaft and having a first clutch element thereon, first means for driving said sleeve portion continually at a timed rate of speed, and a second clutch element secured to said shaft adapted to coact with said first clutch element, said first clutch element including a body having an equal number of teeth arranged circumferentially thereon and equally spaced from each other, said second clutch element including a body having a plurality of pairs of circumferentially arranged pawls thereon adapted to engage the teeth of said first clutch element, the pawls of each pair being diametrically opposed, the number of pairs of pawls being equal to at least twice the number of degrees spacing between immediately adjacent teeth and said immediately adjacent pairs of pawls being spaced from each other starting with the first pair of pawls to the last pair of pawls an equal degree distance plus that part of a degree equal to the number of degrees between immediately adjacent teeth divided by the number of pairs of said pawls so that only one pair of pawls fully engage a pair of diametrically opposed teeth at any time the clutch elements are in egagement, second means for driving said sleeve portion and first clutch element axially on said shaft and into and out of engagement with said second clutch element, said second clutch being a friction clutch coupling said first clutch element and sleeve portion, and said one way spring brake coacting with said sleeve portion to inhibit rotation in a direction opposite to that caused by said first driving means.

12. In a timer device having a clutch as defined in claim 11, wherein said second driving means includes a magnet coil having an armature actuating a clutch arm.

13. In a timer device having a clutch as defined in claim 11, wherein said first clutch element is disc-shaped having a radial face upon which are formed the teeth.

14. In a timer device having a clutch as defined in claim 11, wherein the pawls of said second clutch element are supported by arms extending generally radially from the body thereof.

References Cited
UNITED STATES PATENTS

| | | | |
|---|---|---|---|
| 1,960,004 | 5/1934 | Franz | 192—46 |
| 2,400,818 | 5/1946 | Gallagher | 192—46 |

MARTIN P. SCHWADRON, *Primary Examiner.*

BENJAMIN W. WYCHE, III, *Examiner.*

L. J. PAYNE, *Assistant Examiner.*